United States Patent [19]
White et al.

[11] Patent Number: 5,589,566
[45] Date of Patent: Dec. 31, 1996

[54] COPOLYESTERS HAVING REPEAT UNITS DERIVED FROM SUCCINIC ACID

[75] Inventors: Alan W. White, Kingsport; Barry G. Pearcy, Mount Carmel; Allan S. Jones, Church Hill; Charles M. Buchanan, Bluff City; Robert M. Gardner, Gray, all of Tenn.

[73] Assignee: Eastman Chemical Company, Kingsport, Tenn.

[21] Appl. No.: 609,188

[22] Filed: Mar. 1, 1996

Related U.S. Application Data

[62] Division of Ser. No. 459,442, Jun. 2, 1995, Pat. No. 5,498,453, which is a division of Ser. No. 209,500, Mar. 7, 1994, Pat. No. 5,480,962, which is a division of Ser. No. 96,752, Jul. 22, 1993.

[51] Int. Cl.$^6$ ............................................. C08G 63/82
[52] U.S. Cl. ..................... 528/286; 528/272; 528/274; 528/295; 528/296; 528/302; 524/115; 524/127; 524/128; 524/222; 524/375
[58] Field of Search ............................... 528/272, 274, 528/286, 295, 296, 302; 524/115, 127, 128, 222, 375

[56] References Cited

U.S. PATENT DOCUMENTS

| | | | |
|---|---|---|---|
| 2,012,267 | 8/1935 | Carothers | 528/272 |
| 3,883,901 | 5/1975 | Coquard et al. | 623/1 |
| 3,932,319 | 1/1976 | Clendinning et al. | 47/66 |
| 4,032,993 | 7/1977 | Coquard et al. | 623/12 |
| 4,372,311 | 2/1983 | Potts | 128/287 |
| 4,427,614 | 1/1984 | Barham et al. | 264/210 |
| 4,594,407 | 6/1986 | Nyilas et al. | 528/272 |
| 4,880,592 | 11/1989 | Martini et al. | 264/514 |

FOREIGN PATENT DOCUMENTS

A9414870  3/1994  WIPO.

OTHER PUBLICATIONS

A. C. Albertsson and O. Ljungquist, "Degradable Polymers. IV. Degradation of Aliphatic Thermoplastic Block Copolyesters", J. Macromol. Sci.–Chem., A25(4), 1988, pp. 467–498.

Derwent Abstract JP A,5 140 286, 8 Jun. 1993.

Derwent Abstract JP A,05 070 566, 23 Mar. 1993.

Derwent Abstract JP A,05 140 284, 8 Jun. 1993.

*Primary Examiner*—Samuel A. Acquah
*Attorney, Agent, or Firm*—Betty J. Boshears; Harry J. Gwinnell

[57] ABSTRACT

This invention relates to aliphatic copolyesters prepared from succinic acid (or derivatives thereof) and a process for the preparation thereof. The aliphatic copolyesters contain a second component, 1,4-butanediol, and a third component which is either a diacid or a diol (or derivatives thereof).

7 Claims, 2 Drawing Sheets

COPOLYESTERS HAVING REPEAT UNITS DERIVED FROM SUCCINIC ACID

This is a divisional of Ser. No. 08/459,442 filed on Jun. 2, 1995, now U.S. Pat. No. 5,498,453 which is a divisional of 08/209,500 filed on Mar. 7, 1994, now U.S. Pat. No. 5,480,962 which is a divisional of 08/096,752 filed on Jul. 22, 1993.

FIELD OF THE INVENTION

This invention relates to succinate copolyesters having repeat units derived from succinic acid. These copolyesters are very useful for films and injection molding.

The preparation of aliphatic copolyesters was reported in the mid-1930's as described in U.S. Pat. No. 2,012,267. Since that time, there has been a tremendous amount of work done in the field of polyesters. A very high percentage of this work has been done on aromatic polyesters and copolyesters, such as poly(ethylene terephthalate) because of their high melting points, high glass transition temperatures, good barrier properties, high tensile strengths and other useful properties. There has been little commercial interest in aliphatic polyesters because of their low melting points and relatively poor physical properties.

The melting temperatures of most linear aliphatic polyesters prepared from diacids (or derivatives thereof) and diols are in the range of 50° C.–70° C. Melting temperatures below 80° C.–90° C. are generally not useful for most commercial applications due to dimensional instability upon storage in warm environments.

Two aliphatic polyesters which have unusually high melting temperatures are poly(tetramethylene succinate) and poly(ethylene succinate). Their melting temperatures are 120° C. and 104° C., respectively.

While, in general, aromatic polyesters have superior physical properties to aliphatic polyesters, aromatic polyesters are not rapidly biodegradable. Aliphatic polyesters, on the other hand, are generally considered to be rapidly biodegradable. For example, U.S. Pat. No. 3,932,319 broadly discloses blends of aliphatic polyesters and naturally occurring biodegradable materials. This patent also discloses evidence that several of the aliphatic polyesters are biodegradable.

Aliphatic polyesters prepared from succinic acid have been claimed as surgical articles as in U.S. Pat. No. 3,883,901. In this patent, succinate polyesters prepared from succinic acid and C2 to C6 diols to a "film- or filament-forming molecular weight" are disclosed. Also, preparation of sutures from both poly(ethylene succinate) and poly(tetramethylene succinate) are given.

Several other reports of succinate polyesters from medical applications have been made. In *J. Macromol. Sci.-Chem.*, A25(4), pp. 467–498 (1988) by Albertson and Ljungquist, the preparation of block copolyesters of poly(ethylene succinate/poly(tetramethylene glycol) and their use as suture material was reported. In U.S. Pat. No. 4,594,407, the preparation of polyesters for medical devices from succinic, malic and fumaric acids and 1,4- and 2,3-butanediols was disclosed. U.S. Pat. No. 4,032,993 discloses surgical articles prepared from copolyesters of succinic and oxalic acids and various low molecular weight diols.

SUMMARY OF THE INVENTION

This invention relates to a selected group of high molecular weight, high melting, aliphatic copolyesters prepared from succinic acid (or derivatives thereof), 1,4-butanediol, and a third component which is either a diol or a diacid (or derivatives thereof). More particularly, this invention relates to aliphatic copolyesters having an inherent viscosity of about 1.0 to about 2.0 dL/g as measured at 25° C. in a 60/40 parts by weight solution of phenol/tetrachloroethane wherein the aliphatic copolyester comprises either repeat units having the following structure (A):

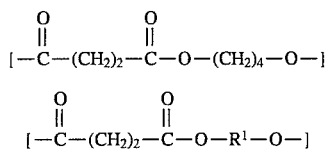

or repeat units having the following structure (B):

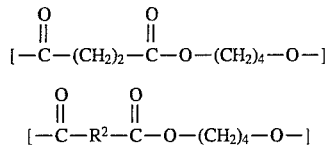

wherein $R^1$ is selected from the group consisting of C2–C12 alkylene, provided that said $C_2$–$C_{12}$ alkylene is other than —$(CH_2)_4$—; C4–C12 cycloalkylene; and C4–C12 oxyalkylene; and $R^2$ is selected from the group consisting of C3–C12 alkylene; C4–C12 cycloalkylene; and C2–C12 oxyalkylene.

It is preferred that the copolyester of this invention is essentially linear. By the term "essentially linear", it is meant that the weight average molecular weight ($M_w$) divided by the number average molecular weight ($M_n$) is less than about 3.0, preferably less than 2.6.

The invention also relates to a process for preparing the high molecular weight aliphatic copolyesters of the invention having good color comprising the following steps:

(i) combining aliphatic copolyester forming monomers with a titanium-based catalyst system and phosphorus-based additive, (ii) in a first stage, heating said reaction mixture between 190° and 220° C. at or slightly above atmospheric pressure, and (iii) in a second stage, heating said reaction mixture between 245° and 260° C. under a reduced pressure of less than 2.0 mm of Ha.

Surprisingly, these copolyesters can be converted to film which show vastly superior properties compared to those of poly(tetramethylene succinate). In addition, these copolyesters can be injection molded to give flexible parts with unexpectedly high impact strengths and elongations compared to poly(tetramethylene succinate) of similar molecular weight.

DETAILED DESCRIPTION OF THE PREFERRED EMBODIMENTS

Figure 1:
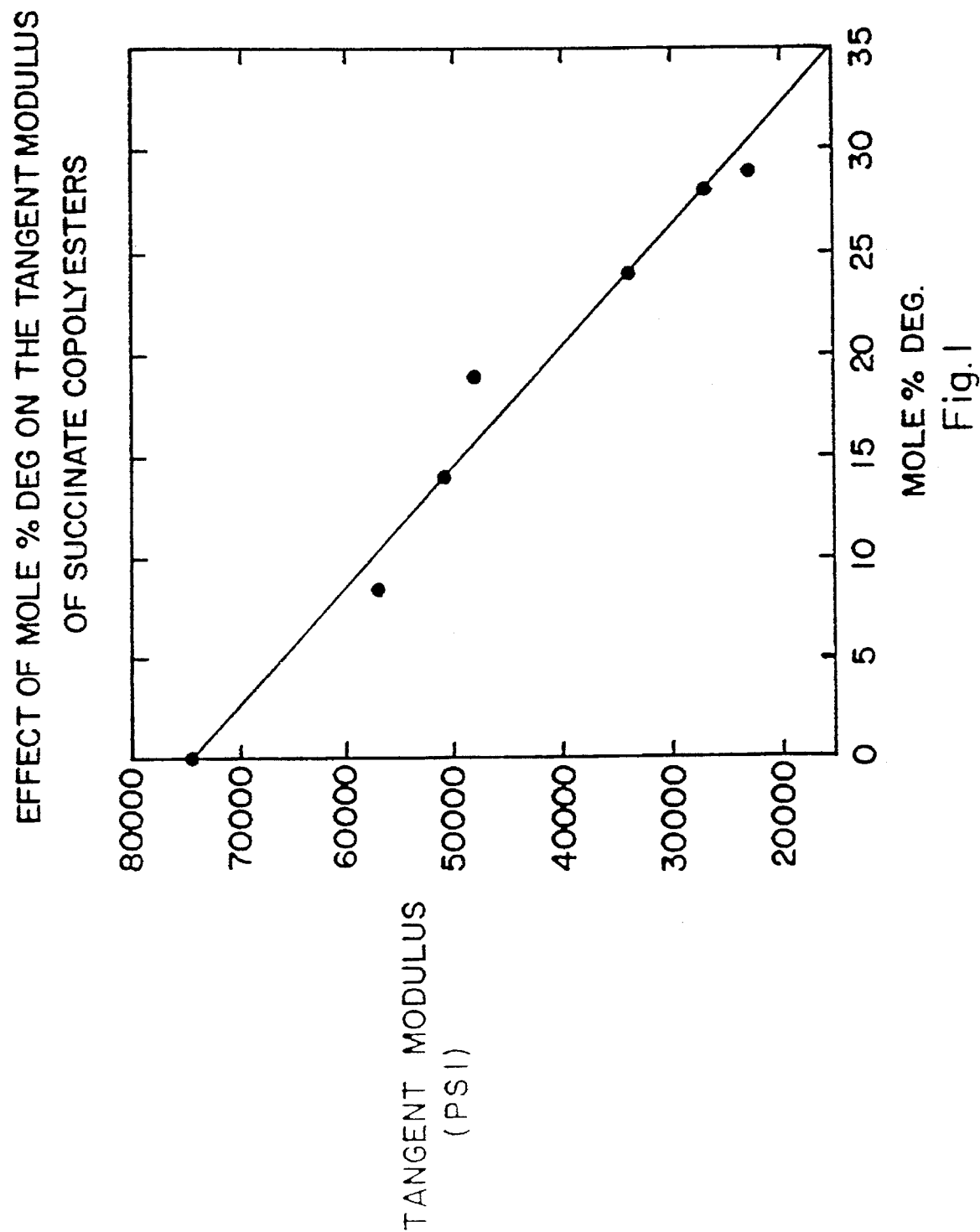
FIG. 1—a graphical representation showing the effect of mole % diethylene glycol on the tangent modulus of succinate copolyester. It refers to Example 25.

The succinate polyesters useful in the present invention are random, aliphatic copolyesters having an inherent viscosity of about 1.0 to about 2.0 dL/g as measured at 25° C. in a 60/40 parts by weight solution of phenol/tetrachloroethane wherein the aliphatic copolyester comprises either repeat units having the following structure (A):

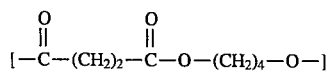

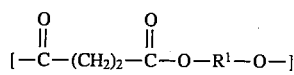

or repeat units having the following structure (B):

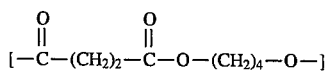

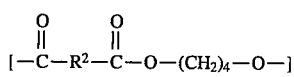

wherein $R^1$ is selected from the group consisting of C2–C12 alkylene, provided that said $C_2$-$C_{12}$ alkylene is other than —$(CH_2)_4$—; C4–C12 cycloalkylene; and C4–C12 oxyalkylene; and $R^2$ is selected from the group consisting of C3–C12 alkylene; C4–C12 cycloalkylene; and C2–C12 oxyalkylene.

As used herein, the term "alkylene" refers to either straight or branched chain alkyl groups, such as —CH2—CH2—CH2 or —CH2—CH(CH3)—CH2—, and the term "cycloalkylene" refers to cyclic alkylene groups which may or may not be substituted. The term "oxyalkylene" refers to an alkylene group which contains one to four oxygen atoms, such as —$CH_2$—$CH_2$—O—$CH_2$—$CH_2$—, which also may be linear or branched.

In general, both a diol and a diacid (or derivative thereof) are used for making the copolyesters of this invention. When mole percentages are noted, they refer to a total of 100 mole % for both the diol and diacid components, and do not refer to mole percentages for the total polymer. These diols and diacids (or derivatives thereof) condense to form the basis of the repeat units of structures (A) and (B).

The copolyesters of this invention can be prepared from succinic acid (or derivatives thereof), 1,4-butanediol, and a third component (either a diol or diacid). In the case where the third component is derived from a diol [structure (A)], the preferred mole % of $R^1$ is about 5 to about 35 mole % and the mole % derived from 1,4-butanediol is about 65 to about 95%. In the case where the third component is derived from a diacid or a derivative thereof [-structure (B)], the preferred mole % of $R^2$ is about 5 to about 35 mole % and the mole % derived from succinic acid (or a derivative thereof) is about 65 to about 95 mole %. Very low levels (up to 5 mole %) of a fourth component [structure (A) or (B)], which can be either a diol or a diacid (or a derivative thereof), are also useful in these succinate copolyesters. When poly(tetramethylene succinate) is modified with less than about 5 mole % of a third component [structure (A) or (B)], the elongation is very low. When poly(tetramethylene succinate) is modified with more than about 35 mole % of a third component [structure (A) or (B)], the copolyester loses most of its crystallinity and is difficult to convert into a useful film.

Where the third and/or fourth component is a diol, preferred diols of the invention are ethylene glycol, propylene glycol, 1,3-propanediol, 2,2-dimethyl-1,3-propanediol, 1,3-butanediol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, diethylene glycol, triethylene glycol, and tetraethylene glycol.

Where the third and/or fourth component is a diacid, preferred diacids of the invention are glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic.

The third or fourth components cannot be either 1,4-butanediol and/or succinic acid since they are already present.

It is preferred that $R^1$ of structure (A) and $R^2$ of structure (B) is present at about 12 to about 30 mole %.

It is more preferred that $R^1$ is selected from the group consisting of C2–C6 alkylene, provided that said $C_2$-$C_6$ alkylene is other than —$(CH_2)_4$—; C5–C8 cycloalkylene; and C4–C8 oxyalkylene; also it is preferred that $R^2$ is selected from the group consisting of C3–C6 alkylene; C5–C8 cycloalkylene; and C2–C12 oxyalkylene.

It is even more preferred that $R^1$ is selected from the group consisting of C2–C6 alkylene, provided that said $C_2$-$C_6$ alkylene is other than —$(CH_2)_4$—; and C4 oxyalkylene; also, it is preferred that $R^2$ is selected from the group consisting of C3–C4 alkylene; and C2 oxyalkylene.

For the purposes of this invention, examples of alkylene are ethylene, propylene, butylene, hexylene, and decylene. Examples of cycloalkylene are cyclobutylene, cyclohexylene and cyclodecylene. Examples of oxyalkylene are oxyethylene, oxypropylene, oxybutylene, oxyhexylene, and dioxyhexylene.

Preferred compositions are poly(tetramethylene succinate-co-glutarate) and poly(tetramethylene succinate-co-adipate) where the mole % derived from the glutarate or adipate is in the range of about 5 to about 35 mole % and poly(tetramethylene-co-ethylene succinate), poly(tetramethylene-co-diethylene succinate), and poly(tetramethylene-co-hexamethylene succinate) wherein the mole % derived from the ethylene glycol, diethylene glycol or 1,6-hexamethylene glycol is in the range of about 5 to about 35 mole %. More preferred ranges for these third components (glycols) would be about 12 to about 30 mole %.

It is preferred that the copolyesters of this invention are essentially linear. However, these copolyesters can be modified with low levels of one or more branching agents. A branching agent is defined as a molecule that has at least three functional groups that can participate in a polyester-forming reaction, such as hydroxyl, carboxylic acid, carboxylic ester, phosphorous-based ester (potentially trifunctional) and anhydride (difunctional).

Typical branching agents useful in the present invention include glycerol, pentaerythritol, trimellitic anhydride, pyromellitic dianhydride, and tartaric acid (and derivatives thereof).

A preferred range for branching agents in the present invention is from about 0.1 to about 2.0 weight %, more preferably about 0.2 to about 1.0 weight %, based on the total weight of the polyester.

Addition of branching agents at low levels does not have a significant detrimental effect on the physical properties and provides additional melt strength which can be very useful in film extruding operations. High levels of branching agents incorporated in the copolyesters result in copolyesters with poor physical properties (e.g., low elongation and low biodegradation rates). These resulting films and injection molded articles from either branched or unbranched succinate copolyesters are useful in the construction of disposable articles, particularly those which benefit from being biodegradable.

Another type of agent that can be added to increase the melt viscosity of the aliphatic polyesters of the invention is one or more ion-containing monomers.

It is preferred that the ion-containing monomer is selected from the group consisting of an alkaline earth metal salt of sulfoisophthalic acid or a derivative thereof. The fourth component of this invention, as described herein, can also be an ion-containing monomer. A typical example of this type of agent is sodiosulfoisophthalic acid dimethyl ester. The preferred weight percentage range for ion-containing monomers is about 0.3 to about 5.0 mole %, preferably about 0.3 to about 3.0 mole %. These ion-containing monomers also increase the melt viscosity of the copolyester and do not reduce the elongation of the films substantially at low levels.

Yet another type of agent that can be added to the reaction involved in the invention is one or more stabilizers for maintenance of color and molecular weight.

In the case of succinate copolyesters, phosphorous-containing compounds are very useful in maintaining color and may improve melt viscosity when incorporated into the polymer as a trifunctional group. In addition, phenolic-type antioxidants are useful in the present invention.

The copolyesters of this invention can optionally be combined with phosphorous-based compounds which are either an organic phosphite or a phosphonite.

Such compounds may be represented by the formulas

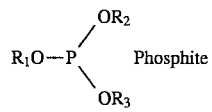

Phosphite where $R_1$, $R_2$ and $R_3$ are selected from an aryl radical of 6 to 30 carbon atoms such as phenyl, nonylphenyl, butyl phenyl, butyl methylphenyl, biphenyl and octylphenyl; and an alkyl radical oil to 30 carbon atoms, such as methyl, ethyl, propyl, butyl, pentyl, hexyl, octyl, decyl, dodecyl, octadecyl, cyclohexyl, isopropyl, isononyl, isooctyl and the like or

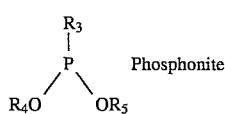

Phosphonite wherein $R_3$, $R_4$ and $R_5$ are as defined for $R_1$, $R_2$ and $R_3$ above.

Examples of these compounds are: tris-(2,4-di-t-butylphenyl)phosphite; tetrakis-(2,4-di-t-butylphenyl)-4,4'-biphenylene phosphite; bis-(2,4-di-t-butylphenyl)pentaerythritol diphosphite; bis-(2,6-di-t-butyl-4-methylphenyl)pentaerythritol diphosphite; 2,2-methylenebis-(4,6-di-t-butylphenyl)octylphosphite; 4,4-butylidenebis-(3-methyl-6-t-butylphenyl-di-tridecyl)phosphite; 1,1,3-tris-(2-methyl-4-tridecylphosphite-5-t-butylphenyl)butane; tris-(mixed mono- and nonylphenyl)phosphite; tris-(nonylphenyl)phosphite; and 4,4'-isopropylidenebis-(phenyl-dialkylphosphite). Preferred compounds are tris-(2,4-di-t-butylphenyl)phosphite; 2,2-methylenebis-(4,6-bi-t-butylphenyl)octylphosphite; bis-(2,6-di-t-butyl-4-methylphenyl)pentaerythritol diphosphite, and tetrakis-(2,4-di-t-butylphenyl)-4,4'-biphenylenephosphonite.

In this invention, it is possible to use one of a combination of more than one type of phosphite or phosphonite compound. The total level for the presence of each or both of the phosphite and phosphonite is in the range of about 0.05–2.0 weight %, preferably 0.1–1.0 weight %, and more preferably 0.1–0.5 weight %.

It is possible to use either one such phosphite or phosphonite or a combination of two or more, as long as the total concentration is in the range of 0.05–2.0 weight %, preferably 0.1–1.0 weight %, and more preferably, 0.1–0.5 weight %.

Particularly preferred phosphites include Weston stabilizers such as Weston 619, a product of General Electric Specialty Chemicals Company, distearyl pentaerythritol diphosphite, having the following structure:

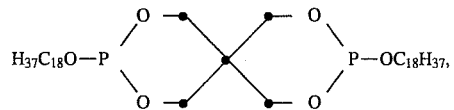

Ultranox stabilizers such as Ultranox 626, an aromatic phosphite produced by General Electric Specialty Chemicals Company, bis(2,4-di-t-butylphenyl) pentaerythritol diphosphite, having the following structure:

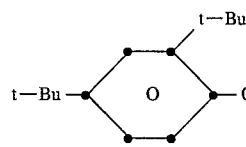

and Irgafos 168, an aromatic phosphite produced by Ciba-Geigy Corp., having the following structure:

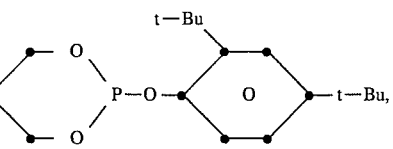

Another example of an aromatic phosphite compound useful within the context of this invention is Ultranox 633, a General Electric Specialty Chemical Company developmental compound which is represented by the following structure:

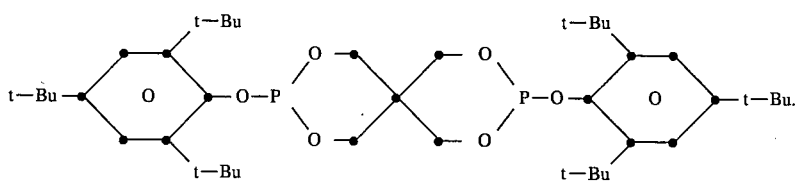

Other commercially available examples of useful aliphatic phosphites are Weston 618 and Weston TSP, both produced by General Electric Specialty Chemicals Company. Still other commercially available examples of useful phosphites are Irganox stabilizers such as Irganox 1010 and Irganox MD 1024 (N,N'-bis(beta-3,5-di-t-butyl-4-hydroxyphenyl-propiono)hydrazide), both sold by Ciba-Geigy Corp.

Other examples of additives of this type that are useful in this invention include phosphoric acid, phosphates, phenolic antioxidants, and ETHANOX antioxidants (available from Ethyl Corp., Baton Rouge, La.).

It is preferred that where the stabilizer is a phosphorus containing stabilizer or a phenolic antioxidant or mixtures thereof, that these be added in a range of about 0.05 to 0.75 weight % of the total weight of the copolyester.

Other additives useful in this invention are inert additives such as talc, clay, $TiO_2$, $CaCO_3$, $NH_4Cl$, silica, calcium oxide, sodium sulfate, and calcium phosphate. These additives may be present in an amount of 0.001–30 weight percent, and more preferably, 0.001 to 15 weight percent.

The preparation of the aliphatic copolyesters of the invention is well known in the art (e.g., U.S. Pat. No. 2,012,267). Such reactions are usually carried out using diols and diacids (or diesters or anhydrides) at temperatures from about 150° C. to about 300° C. in the presence of polycondensation catalysts such as titanium tetrachloride, manganese diacetate, antimony oxide, dibutyl tin diacetate, zinc chloride, or combinations thereof. The catalysts are typically employed in amounts between 10 to 1000 ppm, based on total weight of the reactants. The final stages of the reaction is generally conducted under high vacuum (<10 mm of Hg) in order to produce a high molecular weight polyester.

The invention also relates to a process for preparing the high molecular weight aliphatic copolyesters of this invention having good or enhanced color properties (i.e., essentially white) and comprising the following steps:

(i) combining aliphatic copolyester forming monomers, as described herein, with a titanium-based catalyst system and phosphorus-based additive, (ii) in a first stage, heating said reaction mixture at from 190° and 220° C. at or slightly above atmospheric pressure, and (iii) in a second stage, heating said reaction mixture between 245° and 260° C. under a reduced pressure of 0.05 to 2.00 mm of Hg.

These copolyesters are best prepared with a titanium-based catalyst system, (e.g. titanium tetraisopropoxide, titanium tetraethoxide, titanium tetrabutoxide, titanium tetrachloride) in the presence of a phosphorus-based additive. The preferred concentration of titanium in the reaction is about 5 to about 250 ppm, with the most preferred concentration being about 20 to about 100 ppm. The reaction is best carried out in the two stages as described herein.

It is preferred that the said succinate copolyesters be formed by a combination of 1,4-butanediol, succinic acid (or derivative thereof) and a third component, either a dicarboxylic acid (or derivative thereof) or a diol. Said dicarboxylic acids are selected from the group consisting of the following diacids: glutaric, adipic, pimelic, azelaic, sebacic, fumaric, 2,2-dimethyl glutaric, suberic, 1,3-cyclo-pentanedicarboxylic, 1,4-cyclohexanedicarboxylic, 1,3-cyclohexanedicarboxylic, diglycolic, itaconic, maleic, 2,5-norbornanedicarboxylic, and said diols are selected from the group consisting of ethylene glycol, propylene glycol, 1,3-propanediol, 2,2-dimethyl-1,3-propanediol, 1,3-butanediol, 1,5-pentanediol, 1,6-hexanediol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, diethylene glycol, triethylene glycol, and tetraethylene glycol.

The copolyester of this invention can be converted to dimensionally stable objects selected from the group consisting of films, fibers, foamed objects and molded objects.

The succinate copolyesters can be converted to thin films by a number of methods known to those skilled in the art. For example, thin films can be formed by dipcoating as described in U.S. Pat. Nos. 4,372,311, by compression molding as described in 4,427,614, by melt extrusion as described in 4,880,592, and by melt blowing (extrusion through a circular die). Films can be also prepared by solvent casting. Solvents suitable for dissolving these copolyesters for casting include methylene chloride, chloroform, other chlorocarbons, and tetrahydrofuran. In addition, it is possible to produce uniaxially and biaxially oriented films by a melt extrusion process followed by orientation of the film. These succinate copolyesters are preferably processed in a temperature range of 10°–30° C. above their melting temperatures. Melting temperatures for these copolyesters range from approximately 80°–110° C. Orientation of the films is best conducted in the range of −10° to 70° C.

Films prepared from these copolyesters have relatively low water vapor transmission rates (WVTR), low moduli (flexible), good elongations (will stretch before breaking) and good tear strengths relative to other biodegradable films. Poly(tetramethylene succinate) has a relatively high tangent modulus (stiff), about 75,000 psi. As the mole percent of the third component, $R^1$ or $R^2$, increases, the tangent modulus decreases substantially and therefore, films made from these copolyesters have flexibilities near those of commercial polymer films. For example, polyethylene film has a tangent modulus of approximately 10–20,000 psi. The elongation of poly(tetramethylene succinate) is relatively low even at high molecular weight (IV=1.2). However, as the mole percent of the third component, $R^1$ or $R^2$ is increased, the elongation of films made from these copolyesters increases dramatically (inherent viscosity>1.0 dL/g) and is comparable to many of the commercial films. The branched copolyesters also have useful film properties until the level of branching agent exceeds approximately 2.0 wt %. At this point the concentration of branches becomes high enough that significant elongation is not possible. Thin films produced from these copolyesters may be used in disposable articles such as food packaging, other types of packaging materials, trash (garbage or lawn) bags, and agricultural mulch films. In addition, these thin films are useful as protective barrier films in personal care articles such as infant diapers, incontinence briefs, sanitary (feminine hygiene) napkins, tampons or tampon applicators, bed liners or sheets, bandages, and the like. These personal care articles may be biodegradable. The films generally may be used as a sheet which is impermeable to aqueous-based fluids. They also may be used in or for labels, tags, tapes, bottles, and types of protective clothing.

The succinate copolyesters can also be injection molded. The molded bars are significantly more flexible and have dramatically higher impact strengths than poly(tetramethylene succinate). These improved impact strengths are realized at inherent viscosities less than 1.0 dL/g. Improved elongations are also obtained in the injection molded parts as with the films, and the improved elongations are again only seen above when the I.V.s are greater than about 1.0 dL/g. In addition, injection molded succinate copolyesters will also biodegrade at a much higher rate than the injection molded poly(tetramethylene succinate) items. The succinate copolyesters can be molded into numerous types of flexible objects, such as bottles, pen barrels, toothbrush handles, cotton swab applicators and razor blade handles.

The succinate copolyesters can also be used to prepare foamed food service items. Examples of such items include cups, plates, and food trays.

Biodegradable materials, such as the preferred films of this invention, are initially reduced in molecular weight in the environment by the action of heat, water, air, microbes and other factors. This reduction in molecular weight results in a loss of physical properties (film strength) and often in film breakage. Once the molecular weight of the copolyester is sufficiently low, the monomers and oligomers are then assimilated by the microbes. In an aerobic environment, these monomers or oligomers are ultimately oxidized to $CO_2$, $H_2O$, and new cell biomass. In an anaerobic environment the monomers or oligomers are ultimately oxidized to $CO_2$, $H_2$, acetate, methane, and cell biomass. Successful biodegradation requires that direct physical contact must be established between the biodegradable material and the active microbial population or the enzymes produced by the active microbial population. An active microbial population useful for degrading the films and blends of the invention can generally be obtained from any municipal or industrial wastewater treatment facility or composting facility. Moreover, successful biodegradation requires that certain minimal physical and chemical requirements be met such as suitable pH, temperature, oxygen concentration, proper nutrients, and moisture level. We have found that certain succinic copolyesters are biodegradable in composting environments and hence are particularly useful in the preparation of barrier films in disposable articles. We also have found that succinic copolyesters are more compostable (biodegradable) than poly(tetramethylene succinate) as evidenced by a more rapid breakup of film in a composting environment and by a more rapid loss of molecular weight.

Composting can be defined as the microbial degradation and conversion of solid organic waste into soil. One of the key characteristics of compost piles is that they are self heating; heat is a natural by-product of the metabolic break down of organic matter. Depending upon the size of the pile, or its ability to insulate, the heat can be trapped and cause the internal temperature to rise. Efficient degradation within compost piles relies upon a natural progression or succession of microbial populations to occur. Initially the microbial population of the compost is dominated by mesophilic species (optimal growth temperatures between 20°–45° C.). The process begins with the proliferation of the indigenous mesophilic microflora and metabolism of the organic matter. This results in the production of large amounts of metabolic heat which raise the internal pile temperatures to approximately 55°–65° C. The higher temperature acts as a selective pressure which favors the growth of thermophilic species on one hand (optimal growth range between 45°–60° C.), while inhibiting the mesophiles on the other.

Although the temperature profiles are often cyclic in nature, alternating between mesophilic and thermophilic populations, municipal compost facilities attempt to control their operational temperatures between 55°–60° C. in order to obtain optimal degradation rates. Municipal compost units are also typically aerobic processes, which supply sufficient oxygen for the metabolic needs of the microorganisms permitting accelerated biodegradation rates.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise described. All percentages are by weight unless otherwise described.

EXAMPLES

In the following examples, the tensile strength, elongation at break, and tangent modulus of the films were measured by ASTM method D882; the tear force is measured by ASTM method D1938; the oxygen and water vapor transmission rates are measured by ASTM methods D3985 and F372, respectively. Inherent viscosities are measured at a temperature of 25° C. for a 0.500 gram sample in 100 mL of a 60/40 by weight solution of phenol/tetrachloroethane. DSC measurements were made at a scan rate of 20° C./min. Molecular weights are measured by gel permeation chromatography and are based on polystyrene equivalent molecular weights.

Abbreviations used herein are as follows: "IV" is inherent viscosity; "g" is gram; "psi" is pounds per square inch; "cc" is cubic centimeter; "m" is meter; "rpm" is revolutions per minute; "BOD" is biochemical oxygen demand; "vol." or "v" is volume; "wt." is weight; "mm" is micrometer; "WVTR" is water vapor transmission rate; "mil" is 0.001 inch; "Tg" is glass transition temperature; "Tm" is melting temperature; "DEG" is diethylene glycol; "EG" is ethylene glycol; "PEG" is poly(ethylene glycol); "GPC" is gel permeation chromatography; "Mm" is number average molecular weight; "Mw" is weight average molecular weight; "Mz" is Z-average molecular weight; "NMR" is nuclear magnetic resonance spectroscopy; "DSC" is differential scanning calorimetry.

The composition of the copolyesters is given in brackets following the name. For example, poly(tetramethylene-co-diethylene succinate)[72/28] refers to a copolyester which was prepared from succinic acid (or derivative) as the only diacid component and 1,4-butanediol and diethylene glycol as the two diol components. The molar percentages of the diol components remaining in the polymer are 72 mol % from 1,4-butanediol and 28 mol % from diethylene glycol.

EXAMPLE 1

Preparation of Poly(tetramethylene-co-diethylene succinate)[72/28]

The following materials were charged to a 250 mL single-neck flask:

| Materials | Amounts |
|---|---|
| 1. Succinic Acid (0.50 mole) | 59.1 g |
| 2. DEG (0.43 mole) | 45.6 g |
| 3. 1,4-butanediol (0.57 mol) | 51.5 g |
| 4. Titanium isopropoxide in n-butanol solution (1.25 wt/vol% Ti) | 0.71 ml |

The flask was fitted with a metal stirrer and a nitrogen inlet and was immersed in a Belmont metal bath. The mixture was heated with stirring under nitrogen at 200° C. for 1.0 hour, at 210° C. for 1.0 hour, and at 220° C. for 1.0 hour. The reaction temperature was then increased to 250° C. After stabilizing at 250° C., the internal pressure was reduced to 0.3 mm Hg, and the reaction was continued for 2.0 hrs. The resulting copolymer was pale yellow and semicrystalline. The analytical data are listed below:
Inherent Viscosity=1.23 dL/g
DSC data: $T_g$=−28.2° C.; $T_m$=91.5° C.
NMR data: 27.7 mol % DEG
GPC data: $M_n$=64,400; $M_w$=126,000

EXAMPLE 2

Preparation of Poly(tetramethylene-co-diethylene succinate) [86/14]

The following materials were charged to a 500 mL single-neck flask:

| Materials | Amounts |
|---|---|
| 1. Succinic Acid (1.00 mole) | 118.2 g |
| 2. DEG (0.52) mole | 55.1 g |
| 3. 1,4-butanediol (1.48 mol) | 133.3 g |
| 4. Titanium isopropoxide in n-butanol solution (1.25 wt/vol% Ti) | 1.40 mL |

The flask was fitted with a metal stirrer and a nitrogen inlet and was immersed in a Belmont metal bath. The mixture was heated with stirring under nitrogen at 200° C. for 1.0 hour, at 210° C. for 1.0 hour, and at 220° C. for 1.0 hour. The reaction temperature was then increased to 245° C. After stabilizing at 245° C., the internal pressure was reduced to 0.3 mm Hg, and the reaction was continued for 2.0 hours. The resulting copolymer was pale yellow and semicrystalline. The analytical data are listed below:
Inherent Viscosity=0.832 dL/g
DSC data: $T_g$=−25.8° C.; $T_m$=81.7° C.
NMR data: 14.0 mol % DEG

EXAMPLE 3

Preparation of Poly(tetramethylene-co-diethylene succinate)[71/29]

The following materials were charged to a 250 mL single-neck flask:

| Materials | Amounts |
|---|---|
| 1. Succinic Acid (0.50 mole) | 59.1 g |
| 2. DEG (0.46 mole) | 48.7 g |
| 3. 1,4-butanediol (0.54 mol) | 48.8 g |
| 4. Titanium isopropoxide in n-butanol solution (1.25 wt/vol% Ti) | 0.71 ml |

The flask was fitted with a metal stirrer and a nitrogen inlet and was immersed in a Belmont metal bath. The mixture was heated with stirring under nitrogen at 200° C. for 1.0 hour, at 210° C. for 1.0 hour, and at 220° C. for 1.0 hour. The reaction temperature was then increased to 250° C. After stabilizing at 250° C., the internal pressure was reduced to 0.3 mm Hg, and the reaction was continued for 2.0 hours. The resulting copolymer was pale yellow and semicrystalline. The analytical data are listed below:
Inherent Viscosity=1.46 dL/g
DSC data: $T_g$=−29.7° C.; $T_m$=85.1° C.
NMR data: 29.0 mol % DEG
GPC data: $M_n$=77,800; $M_w$=151,000

EXAMPLE 4

Preparation of Poly(tetramethylene-co-diethylene succinate)[55/45]

The following materials were charged to a 250 mL single-neck flask:

| Materials | Amounts |
|---|---|
| 1. Succinic Acid (0.50 mole) | 59.1 g |
| 2. DEG (0.60 mole) | 63.6 g |
| 3. 1,4-butanediol (0.40 mol) | 36.1 g |
| 4. Titanium isopropoxide in n-butanol solution (1.25 wt/vol% Ti) | 0.72 ml |

The flask was fitted with a metal stirrer and a nitrogen inlet and was immersed in a Belmont metal bath. The mixture was heated with stirring under nitrogen at 200° C. for 1.0 hour, at 210° C. for 1.0 hour, and at 220° C. for 1.0 hour. The reaction temperature was then increased to 245° C. After stabilizing at 245° C., the internal pressure was reduced to 0.3 mm Hg, and the reaction was continued for 3.0 hours. The resulting copolymer was pale yellow and amorphous. The analytical data are listed below:
Inherent Viscosity=1.04 dL/g
DSC data: $T_g$=−30.0° C.; $T_m$=None
NMR data: 45.5 mol % DEG
GPC data: $M_n$=49,500; $M_w$=95,000

EXAMPLE 5

Preparation of Poly(tetramethylene succinate-co-glutarate)[86/14]

The following materials were charged to a 500 mL single-neck flask:

| Materials | Amounts |
| --- | --- |
| 1. Succinic Acid (0.85 mole) | 100.4 g |
| 2. Dimethyl glutarate (0.15 mole) | 24.0 g |
| 3. 1,4-butanediol (2.0 mol) | 180.2 g |
| 4. Titanium isopropoxide in n-butanol solution (1.25 wt/vol% Ti) | 1.4 mL |

The flask was fitted with a metal stirrer and a nitrogen inlet and was immersed in a Belmont metal bath. The mixture was heated with stirring under nitrogen at 200° C. for 1.25 hour, and at 210° C. for 1.75 hours. The reaction temperature was then increased to 245° C. After stabilizing at 245° C., the internal pressure was reduced to 0.3 mm Hg, and the reaction was continued for 2.75 hours. The resulting copolymer was pale yellow and semicrystalline. The analytical data are listed below:
Inherent Viscosity=0.908 dL/g
DSC data: Tm=105.5° C.
NMR data: 14.1 mol % glutarate

EXAMPLE 6

Preparation of Poly(tetramethylene succinate-co-glutarate)[70/30]

The following materials were charged to a 250 mL single-neck flask:

| Materials | Amounts |
| --- | --- |
| 1. Succinic Acid (0.35 mole) | 41.4 g |
| 2. Dimethyl glutarate (0.15 mole) | 24.0 g |
| 3. 1,4-butanediol (1.0 mol) | 90.4 g |
| 4. Titanium isopropoxide in n-butanol solution (1.25 wt/vol% Ti) | 0.71 mL |

The flask was fitted with a metal stirrer and a nitrogen inlet and was immersed in a Belmont metal bath. The mixture was heated with stirring under nitrogen at 190° C. for 1.0 hour, at 200° C. for 1.0 hour, and at 210° C. for 1.0 hour. The reaction temperature was then increased to 250° C. After stabilizing at 250° C., the internal pressure was reduced to 0.3 mm Hg, and the reaction was continued for 2.0 hours. The resulting copolymer was pale yellow and semicrystalline. The analytical data are listed below:
Inherent Viscosity=1.04 dL/g
DSC data: Tg=−42.1° C.; Tm=86.2° C.
NMR data: 29.7 mol % glutarate
GPC data: Mn=40,700; Mw=91,300;

EXAMPLE 7

Preparation of Poly(tetramethylene-co-ethylene succinate)[83/17]

The following materials were charged to a 500 mL single-neck flask:

| Materials | Amounts |
| --- | --- |
| 1. Succinic Acid (1.0 mole) | 102 g |
| 2. Ethylene glycol (0.90 mol) | 55.8 g |
| 3. 1,4-butanediol (1.32 mol) | 118.8 g |
| 4. Titanium isopropoxide in n-butanol solution (1.25 wt/vol% Ti) | 1.25 mL |

The flask was fitted with a metal stirrer and a nitrogen inlet and was immersed in a Belmont metal bath. The mixture was heated with stirring under nitrogen at 200° C. for 1.25 hour and at 210° C. for 2.0 hours. The reaction temperature was then increased to 245° C. After stabilizing at 245° C., the internal pressure was reduced to 0.1 mm Hg, and the reaction was continued for 1.2 hours. The resulting copolymer was pale yellow and semicrystalline. The analytical data are listed below:
Inherent Viscosity=1.22 dL/g
DSC data: Tg=−29° C.; Tm=100.3° C.
NMR data: 16.7 mol % ethylene glycol

EXAMPLE 8

Preparation of Poly(tetramethylene-co-ethylene succinate)[83/17]

The following materials were charged to a 500 mL single-neck flask:

| Materials | Amounts |
| --- | --- |
| 1. Succinic Acid (1.0 mole) | 102 g |
| 2. Ethylene glycol (1.20 mol) | 74.4 g |
| 3. 1,4-butanediol (0.96 mol) | 86.4 g |
| 4. Titanium isopropoxide in n-butanol solution (1.25 wt/vol% Ti) | 1.25 mL |

The flask was fitted with a metal stirrer and a nitrogen inlet and was immersed in a Belmont metal bath. The mixture was heated with stirring under nitrogen at 200° C. for 1.25 hour and at 210° C. for 2.0 hours. The reaction temperature was then increased to 245° C. After stabilizing at 245° C., the internal pressure was reduced to 0.1 mm Hg, and the reaction was continued for 2.5 hours. The resulting copolymer was pale yellow and semicrystalline. The analytical data are listed below:
Inherent Viscosity=1.46 dL/g
DSC data: Tg=−29.3° C.; Tm=81.5° C.
NMR data: 30.4 mol % ethylene glycol
GPC data: Mn=79,000;

EXAMPLE 9

Preparation of Poly(tetramethylene succinate-co-diglycolate)[86/14]

The following materials were charged to a 500 mL single-neck flask:

| Materials | Amounts |
|---|---|
| 1. Succinic Acid (0.87 mole) | 102.7 g |
| 2. Diglycolic acid (0.13 mol) | 17.4 g |
| 3. 1,4-butanediol (2.0 mol) | 180 g |
| 4. Titanium isopropoxide in n-butanol solution (1.25 wt/vol% Ti) | 1.40 mL |

The flask was fitted with a metal stirrer and a nitrogen inlet and was immersed in a Belmont metal bath. The mixture was heated with stirring under nitrogen at 200° C. for 1.0 hour, at 210° C. for 1.0 hour and at 220° C. for 1.0 hour. The reaction temperature was then increased to 245° C. After stabilizing at 245° C., the internal pressure was reduced to 0.1 mm Hg, and the reaction was continued for 3.0 hours. The resulting copolymer was light brown and semicrystalline. The analytical data are listed below:
Inherent Viscosity=0.742 dL/g
DSC data: Tg=−30.43° C.; Tm=104.5° C.
NMR data: 13.9 mol % diglycolic acid

EXAMPLE 10

Preparation of Poly(tetramethylene-co-hexamethylene succinate)[87/13]

The following materials were charged to a 250 mL single-neck flask:

| Materials | Amounts |
|---|---|
| 1. Succinic Acid (0.50 mole) | 59.1 g |
| 2. 1,6-hexanediol (0.10 mole) | 11.8 g |
| 3. 1,4-butanediol (0.90 mol) | 81.1 g |
| 4. Titanium isopropoxide in n-butanol solution (1.25 wt/vol% Ti) | 0.87 mL |

The flask was fitted with a metal stirrer and a nitrogen inlet and was immersed in a Belmont metal bath. The mixture was heated with stirring under nitrogen at 200° C. for 1.0 hour and at 210° C. for 3.0 hours. The reaction temperature was then increased to 260° C. After stabilizing at 260° C., the internal pressure was reduced to 0.2 mm Hg, and the reaction was continued for 3.3 hours. The resulting copolymer was pale yellow and semicrystalline. The analytical data are listed below:
Inherent Viscosity=1.315 dL/g
DSC data: Tg=−33.1° C.; Tm=103.1° C.
NMR data: 13.4 mol % 1,6-hexanediol
GPC data: $M_n$=53,400; Mw=134,000

EXAMPLE 11

Preparation of Poly(tetramethylene succinate-co-adipate)[79/21]

The following materials were charged to a 500 mL single-neck flask:

| Materials | Amounts |
|---|---|
| 1. Succinic Acid (0.80 mole) | 94.5 g |
| 2. Adipic acid (0.20 mol) | 29.2 g |
| 3. 1,4-butanediol (2.0 mol) | 180.0 g |
| 4. Titanium isopropoxide in n-butanol solution (1.02 wt/vol% Ti) | 0.87 mL |
| 5. ULTRANOX 626 (0.1 wt %) | 0.178 g |

The flask was fitted with a metal stirrer and a nitrogen inlet and was immersed in a Belmont metal bath. The mixture was heated with stirring under nitrogen at 200° C. for 1.0 hour, at 210° C. for 1.0 hour and at 220° C. for 0.5 hour. The reaction temperature was then increased to 260° C. After stabilizing at 260° C., the internal pressure was reduced to 0.2 mm Hg, and the reaction was continued for 3.5 hours. The resulting copolymer was white and semicrystalline. The analytical data are listed below:
Inherent Viscosity=0.949 dL/g
DSC data: Tg=−39.7° C.; Tm=95.4° C.
NMR data: 21.2 mol % adipate
GPC data: Mn=32,400; Mw=83,400

EXAMPLE 12

Preparation of Poly(tetramethylene succinate)

The following materials were charged to a 500 mL single-neck flask:

| Materials | Amounts |
|---|---|
| 1. Succinic Acid (0.50 mole) | 59.1 g |
| 2. 1,4-butanediol (1.0 mol) | 90.0 g |
| 3. Titanium isopropoxide in n-butanol solution (1.02 wt/vol% Ti) | 0.84 mL |

The flask was fitted with a metal stirrer and a nitrogen inlet and was immersed in a Belmont metal bath. The mixture was heated with stirring under nitrogen at 200° C. for 1.0 hour, at 210° C. for 1.0 hour and at 220° C. for 1.0 hour. The reaction temperature was then increased to 250° C. After stabilizing at 250° C., the internal pressure was reduced to 0.2 mm Hg, and the reaction was continued for 3.5 hours. The resulting polymer was pale yellow and semicrystalline. The analytical data are listed below:
Inherent Viscosity=1.12 dL/g
DSC data: Tm=120.8° C.
NMR data: Consistent with poly(tetramethylene succinate)
GPC data: Mn=40,000; Mw=101,000

EXAMPLE 13

Preparation of Poly(tetramethylene-co-diethylene succinate)[71/29] with 0.5 wt % glycerol The following materials were charged to a 250 mL single-neck flask:

| Materials | Amounts |
| --- | --- |
| 1. Succinic Acid (0.50 mole) | 59.1 g |
| 2. DEG (0.43 mole) | 45.6 g |
| 3. 1,4-butanediol (0.57 mol) | 51.5 g |
| 4. Titanium isopropoxide in n-butanol solution (1.25 wt/vol% Ti) | 0.71 ml |
| 5. Glycerol (0.5 wt %) | 0.44 g |

The flask was fitted with a metal stirrer and a nitrogen inlet and was immersed in a Belmont metal bath. The mixture was heated with stirring under nitrogen at 200° C. for 1.0 hour, at 210° C. for 1.0 hour, and at 220° C. for 1.0 hour. The reaction temperature was then increased to 250° C. After stabilizing at 250° C., the internal pressure was reduced to 0.3 mm Hg, and the reaction was continued for 2.75 hours. The resulting copolymer was pale yellow and semicrystalline. The analytical data are listed below:
Inherent Viscosity=1.26 dL/g
DSC data: Tg=−28.8° C.; Tm=87.4° C.
NMR data: 28.6 mol % DEG

EXAMPLE 14

Preparation of Poly(tetramethylene-co-diethylene succinate)[71/29] with 1.5 wt % glycerol The following materials were charged to a 250 mL single-neck flask:

| Materials | Amounts |
| --- | --- |
| 1. Succinic Acid (0.50 mole) | 59.1 g |
| 2. DEG (0.43 mole) | 45.6 g |
| 3. 1,4-butanediol (0.57 mol) | 51.5 g |
| 4. Titanium isopropoxide in n-butanol solution (1.25 wt/vol% Ti) | 0.71 ml |
| 5. Glycerol (1.5 wt %) | 1.31 g |

The flask was fitted with a metal stirrer and a nitrogen inlet and was immersed in a Belmont metal bath. The mixture was heated with stirring under nitrogen at 200° C. for 1.0 hour, at 210° C. for 1.0 hour, and at 220° C. for 1.0 hour. The reaction temperature was then increased to 250° C. After stabilizing at 250° C., the internal pressure was reduced to 0.3 mm Hg, and the reaction was continued for 2–0 hours. The resulting copolymer was pale yellow and semicrystalline. The analytical data are listed below:
Inherent Viscosity=1.23 dL/g
DSC data: Tg=−29.1° C.; Tm=85.4° C.
NMR data: 28.5 mol % DEG
GPC data: Mn=32,100; Mw=170,000; Mz/Mn=16.6

EXAMPLE 15

Preparation of Poly(tetramethylene-co-diethylene succinate)[71/29] with 0.25 wt % pentaerythritol The following materials were charged to a 250 mL single-neck flask:

| Materials | Amounts |
| --- | --- |
| 1. Succinic Acid (0.50 mole) | 59.1 g |
| 2. DEG (0.43 mole) | 45.6 g |
| 3. 1,4-butanediol (0.57 mol) | 51.5 g |
| 4. Titanium isopropoxide in n-butanol solution (1.25 wt/vol% Ti) | 0.71 ml |
| 5. Pentaerythritol (0.25 wt %) | 0.22 g |

The flask was fitted with a metal stirrer and a nitrogen inlet and was immersed in a Belmont metal bath. The mixture was heated with stirring under nitrogen at 200° C. for 1.0 hour, at 210° C. for 1.0 hour, and at 220° C. for 1.0 hour. The reaction temperature was then increased to 250° C. After stabilizing at 250° C., the internal pressure was reduced to 0.1 mm Hg, and the reaction was continued for 1.0 hour. The resulting copolymer was pale yellow and semicrystalline. The analytical data are listed below:
Inherent Viscosity=1.39 dL/g
DSC data: Tg=−31.8° C.; Tm=86.2° C.
NMR data: 28.0 mol % DEG
GPC data: Mn=29,000; Mw=149,000; Mz/Mn=15.2

EXAMPLE 16

Preparation of Poly(tetramethylene-co-diethylene succinate)[73/27] with 0.2 wt % tartrate The following materials were charged to a 250 mL single-neck flask:

| Materials | Amounts |
| --- | --- |
| 1. Succinic Acid (0.50 mole) | 59.1 g |
| 2. DEG (0.43 mole) | 45.6 g |
| 3. 1,4-butanediol (0.57 mol) | 51.5 g |
| 4. Titanium isopropoxide in n-butanol solution (1.25 wt/vol% Ti) | 0.71 ml |
| 5. Dimethyl L-tartrate (0.20 wt %) | 0.18 g |

The flask was fitted with a metal stirrer and a nitrogen inlet and was immersed in a Belmont metal bath. The mixture was heated with stirring under nitrogen at 200° C. for 1.0 hour, at 210° C. for 1.0 hour, and at 220° C. for 1.0 hour. The reaction temperature was then increased to 250° C. After stabilizing at 250° C., the internal pressure was reduced to 0.2 mm Hg, and the reaction was continued for 1.5 hour. The resulting copolymer was light brown and semicrystalline. The analytical data are listed below:
Inherent Viscosity=1.36 dL/g
DSC data: Tg=−28.4° C.; Tm=91.5° C.
NMR data: 27.0 mol % DEG
GPC data: Mn=65,000; Mw=147,000; Mz/Mn=4.35

EXAMPLE 17

Preparation of Poly(tetramethylene-co-diethylene succinate)[77/23] with 1.7 wt % sodiosulfoisophthalate The following materials were charged to a 250 mL single-neck flask:

| Materials | Amounts |
| --- | --- |
| 1. Succinic Acid (0.982 mole) | 116 g |
| 2. DEG (0.64 mole) | 67.8 g |
| 3. 1,4-butanediol (1.36 mol) | 122.5 g |
| 4. Titanium isopropoxide in n-butanol solution (1.25 wt/vol% Ti) | 1.4 mL |
| 5. Dimethyl sodiosulfoisophthalate (1.7 wt %) | 5.33 g |

The flask was fitted with a metal stirrer and a nitrogen inlet and was immersed in a Belmont metal bath. The mixture was heated with stirring under nitrogen at 200° C. for 1.0 hour, at 210° C. for 1.0 hour, and at 220° C. for 1.0 hour. The reaction temperature was then increased to 245° C. After stabilizing at 245° C., the internal pressure was reduced to 0.3 mm Hg, and the reaction was continued for 2.25 hour. The resulting copolymer was pale yellow and semicrystalline. The analytical data are listed below:

Inherent Viscosity=1.019 dL/g
DSC data: $T_g$=−30.2° C.; $T_m$=91.4° C.
NMR data: 23.8 mol % DEG
GPC data: Mn=17,600; Mw=48,900; Mz/Mn=4.6

EXAMPLE 18

The following are additional examples of succinate copolyesters which were made by procedures similar to that described in Example 1.

Properties of Copolymers of Poly(tetramethylene Succinate)

| Third Component | Third Component (Mole %) | I.V. (dL/g) | Tm (°C.) | Tg (°C.) |
| --- | --- | --- | --- | --- |
| DEG | 8.5 | 1.29 | 110.4 | — |
| DEG | 11 | 0.97 | 107.7 | −26.9 |
| DEG | 19 | 0.94 | 99.1 | −32.9 |
| DEG | 24 | 1.05 | 97.4 | −24.9 |
| EG | 15 | 0.98 | 103.7 | −28.1 |
| EG | 15 | 1.38 | 105.4 | −26.0 |
| EG | 20 | 1.24 | 96.4 | −29.0 |
| EG | 26 | 0.96 | 88.8 | −34.0 |

EXAMPLE 19

The following are additional examples of succinate copolyesters which were prepared using low levels of branching agents by procedures similar to Example 13.

Properties of Branched Succinate Copolyesters

| Third Component | Branch Ag. | Third Comp. Mol % | Br. Ag. Wt. % | I.V. dL/g | Tm (°C.) | Tg (°C.) | Mz/Mn |
| --- | --- | --- | --- | --- | --- | --- | --- |
| DEG | Glycerol | 28.2 | 0.8 | 1.47 | 86.0 | −31.2 | 14.3 |
| DEG | Glycerol | 29.3 | 3.0 | 1.01 | 84.1 | −26.7 | 20.4 |
| EG | Glycerol | 29.0 | 0.3 | 0.82 | 87.4 | −30.0 | 5.2 |
| EG | Glycerol | 29.0 | 0.6 | 0.77 | 87.7 | −30.0 | 7.9 |
| DEG | Pentaerythritol | 27.8 | 0.5 | — | 87.3 | −28.7 | 14.8 |
| EG | Pentaerythritol | 27.0 | 0.2 | 1.10 | 90.7 | — | 34.2 |
| EG | Dimethyl Tartrate | 26.2 | 1.0 | 1.05 | 88.7 | −29.5 | 6.8 |

EXAMPLE 20

Blown film from poly(tetramethylene succinate-co-glutarate) [80/20] was produced using a laboratory scale blown film line which consisted of a Killion 1.25 inch extruder with a 15:1 gear reducer. The screw was a Maddock mixing type with an L/D of 24 to 1, although a general purpose screw has also been used. Compression ratio for the mixing screw was 3.5:1. A 1.21 inch diameter die with a 5 mil die gap was used. The air ring was a Killion single-lip, No. 2 type. A variety of conditions are possible for producing melt blown films from the copolyesters of this invention. Temperature set points for the extruders can vary depending on the level of inert additives, if any, but are generally in the range of 10°–30° C. above the melting point of the copolyester. For this example, the level of inert additives was approximately 6 wt % (average diameter of inert particles was less than 10 microns) and all heater zones were set between 105°–110° C. with a screw rpm of 20 to 25. This produced a measured melt temperature of 101° C., an amperage of 17 amps, and a pressure of 1,200 psi. Superior performance is generally obtained at the lowest operating temperature possible. Blowing conditions can be characterized by the blow up ratio (BUR), the ratio of bubble diameter to die diameter which gives an indication of hoop or transverse direction (TD) stretch; and the draw-down ratio (DDR), which is an indication of the axial or machine direction (MD) stretch. The BUR and DDR were 4.0 and 1.4, respectively, in this example. Prior to processing, the copolyesters were dried overnight at 50° C. in dehumidified air dryers. The physical properties of the film obtained are in the table below.

| Property of Film | Machine Direction | Transverse Direction |
|---|---|---|
| Elongation at Break (%) | 283 | 359 |
| Tangent Modulus (psi) | 28,000 | 24,000 |
| Tensile Strength (psi) | 2,260 | 3,290 |

EXAMPLE 21

Blown film from poly(tetramethylene-co-ethylene succinate) [85/15] with an I.V. of 1.38 was produced using a laboratory scale blown film line as described in the previous example. Prior to processing, the copolyester was dried overnight at 60° C. in dehumidified air dryers. For this example, the level of inert additives was approximately 6 wt % (average diameter of inert particles was less than 10 microns), all heater zones were set at 140° C. This produced a measured melt temperature of 110° C., an amperage of 16 amps, and a pressure of 2,200 psi. The physical properties of the film obtained are in the table below.

| Property of Film | Machine Direction | Transverse Direction |
|---|---|---|
| Elongation at Break (%) | 481 | 341 |
| Tangent Modulus (psi) | 39,000 | 39,000 |
| Tensile Strength (psi) | 3,150 | 4,330 |

EXAMPLE 22

Blown film from poly(tetramethylene-co-diethylene succinate) [71/29] with 0.2 wt % pentaerythritol and an I.V. of 1.10 was produced using a laboratory scale blown film line as described in the previous example. Prior to processing, the copolyester was dried overnight at 60° C. in dehumidified air dryers. For this example, the level of inert additives was approximately 9 wt % (average diameter of inert particles was less than 10 microns), the initial heater zone was at 80° C. and Zones 2–5 were set at 90° C. The screw speed was set at 40 rpm. This produced a measured melt temperature of 85° C., an amperage of 12 amps, and a pressure of 2,100 psi. The physical properties of the film obtained are in the table below.

| Property of Film | Machine Direction | Transverse Direction |
|---|---|---|
| Elongation at Break (%) | 179 | 51 |
| Tangent Modulus (psi) | 29,000 | 32,000 |
| Tensile Strength (psi) | 2,230 | 1,290 |

EXAMPLE 23

Films were also solvent cast from a number of these copolyesters. The polyesters were dried either under vacuum or by desiccant drying and dissolved in either chloroform or methylene chloride at a concentration of 10–20 wt %. The films were cast on stainless steel plates and drawn down to approximately 15 mil with a "doctor" blade. The solvent evaporated slowly to leave films of approximately 1.5 mil in thickness. Below are some physical properties of solvent cast films.

| Physical Properties of Solvent Cast Films Prepared from Succinate Copolyesters ||||||
|---|---|---|---|---|---|
| Third Component | Mol % | I.V. (dL/g) | Elongation at Break (%) | Tangent Modulus (psi) | Tensile Strength (psi) |
| EG | 20 | 1.24 | 303 | 32,000 | 4,330 |
| EG | 26 | 0.96 | 61 | 33,000 | 1,860 |
| EG | 30 | 1.46 | 260 | 24,000 | 2,150 |
| Glutarate | 30 | 1.04 | 211 | 32,000 | 2,160 |

EXAMPLE 24

The following table shows examples of the relationship between inherent viscosity of the succinate copolyester and elongation of thermally cast films. The elongation of copolyesters substantially increases when the inherent viscosity is greater than about 1.0 dL/g. Elongation of Films Prepared from Succinate Copolyesters

| Third Component | Mol % | I.V. (dL/g) | Elongation at Break (%) |
|---|---|---|---|
| DEG | 14 | 0.83 | 9 |
| DEG | 14 | 1.57 | 656 |
| DEG | 24 | 1.05 | 487 |
| DEG | 28 | 1.23 | 616 |
| DEG | 29 | 1.46 | 776 |
| DEG | 29 | 1.10 | 179 |
| EG | 15 | 0.98 | 76 |
| EG | 15 | 1.38 | 481 |
| EG | 20 | 1.24 | 303 |
| EG | 30 | 1.46 | 260 |
| 1,6-Hexanediol | 13 | 1.32 | 313 |
| Dimethyl glutarate | 14 | 0.91 | 13 |
| Dimethyl glutarate | 20 | 1.06 | 283 |
| Dimethyl glutarate | 30 | 1.04 | 211 |
| Diglycolic acid | 14 | 0.74 | 11 |

EXAMPLE 25

The following example shows the relationship between the level of the third component and the tangent modulus. As the level of the third component increases, the tangent modulus decreases indicating a more flexible film. Also, FIG. 1 is a graphical representation showing the effect of mole % DEG on the tangent modulus.

| Tangent Moduli of Succinate Copolyesters ||||
|---|---|---|---|
| Third Component | Third Component (Mole %) | I.V. (dL/g) | Tangent Modulus (psi) |
| None | 0.0 | 1.12 | 75,000 |
| DEG | 8.5 | 1.29 | 57,000 |
| DEG | 14 | 0.83 | 51,000 |
| DEG | 19 | 0.94 | 48,000 |
| DEG | 24 | 1.05 | 34,000 |
| DEG | 28 | 1.23 | 27,000 |
| DEG | 29 | 1.46 | 23,000 |

EXAMPLE 27

The following examples show the dramatic increase in elongation of thermally cast films that occurs when poly(tetramethylene succinate) is modified with a third component and the inherent viscosity is greater than about 1.0 dL/g.

Figure 2:
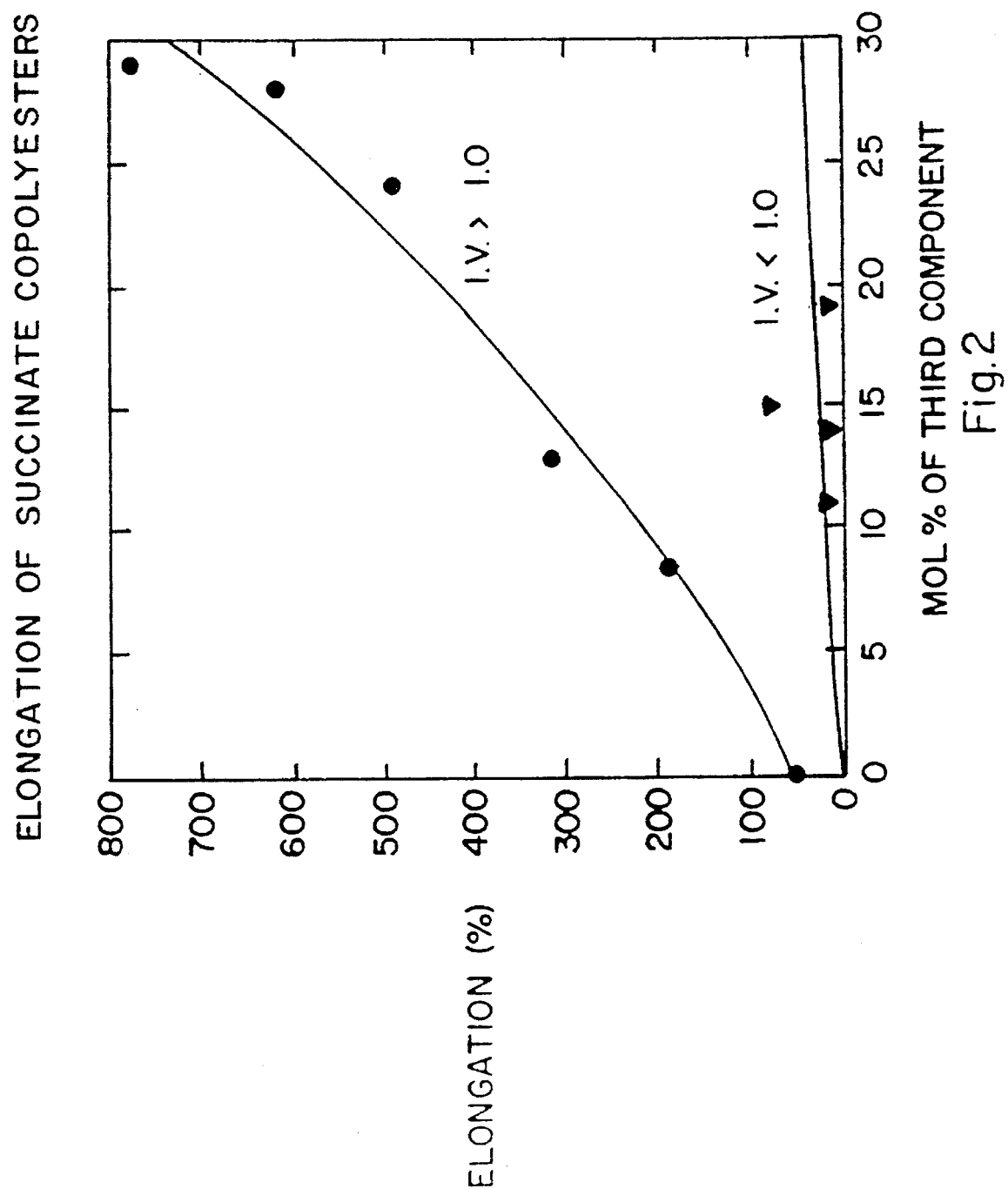
FIG. 2—a graphical representation showing the elongation of succinate polyesters. It refers to Example 27.

Also, FIG. 2 is a graphical representation showing the elongation of succinate copolyesters.

Elongation of Succinate Copolyesters

| Third Component | Mol % | I.V. (dL/g) | % Elongation at Break |
|---|---|---|---|
| None | 0 | 1.12 | 48 |
| DEG | 8 | 1.29 | 188 |
| Hexanediol | 13 | 1.32 | 313 |
| DEG | 24 | 1.05 | 487 |
| Glutarate | 14 | 0.91 | 13 |
| DEG | 14 | 0.83 | 9 |
| DEG | 19 | 0.94 | 13 |
| DEG | 28 | 1.23 | 616 |
| DEG | 29 | 1.46 | 776 |

EXAMPLE 28

This example shows how the elongation is affected by the addition of various levels of branching agents to poly(tetramethylene-co-diethylene succinate).

Elongation of Films From Branched Succinate Copolyesters

| Third Component | Branching Agent | Third Component (Mole %) | Branch Agent (wt. %) | I.V. (dL/g) | Elongation at Break (%) |
|---|---|---|---|---|---|
| DEG | Dimethyl Tartrate | 27.1 | 0.20 | 1.36 | 526 |
| DEG | Pentaerythritol | 28.0 | 0.25 | 1.39 | 443 |
| DEG | Glycerol | 28.6 | 0.50 | 1.26 | 442 |
| DEG | Glycerol | 28.5 | 1.50 | 1.23 | 261 |
| DEG | Dimethyl Sodiosulfo-isophthalate | 22.0 | 1.70 | 1.02 | 169 |
| DEG | Glycerol | 29.3 | 3.00 | 1.01 | 7 |

EXAMPLE 29

In order to assess the biodegradation potential of the test films, small-scale compost units were employed to simulate the active treatment processes found in a municipal solid waste composter. These bench-scale units displayed the same key features that distinguish the large-scale municipal compost plants. The starting organic waste was formulated to be representative of that found in municipal solid waste streams: a carbon to nitrogen of 25:1 ratio, a 55% moisture content, a neutral pH, a source of readily degradable organic carbon (e.g. cellulose, protein, simple carbohydrates, and lipids), and had a particle size that allowed good air flow through the mass. Prior to being placed in a compost unit, all test films were carefully dried and weighed. Test films were mixed with the compost at the start of an experiment and incubated with the compost for 15 days. The efficiency of the bench scale compost units were determined by monitoring the temperature profiles and dry weight disappearance of the compost. These bench scale units typically reached 60°–65° C. within 8 hours. After 15 days of incubation there was typically a 40% dry weight loss in the compost. Films were harvested after 15 days of incubation and carefully washed, dried, and weighed to determine weight loss.

Composting Results for Succinate Copolyesters

| Third Component | Third Component Mol % | Weight Loss After Composting (%) | Mw Before Composting | Mw After Composting | Loss of Mw (%) |
|---|---|---|---|---|---|
| None | 0 | 1.5 | 53,700 | 51,900 | 3.4 |
| DEG | 25 | * | 170,000 | 138,000 | 18.8 |
| EG | 16 | * | 153,000 | 126,000 | 17.6 |
| DEG (+0.5 wt. % glycerol) | 26 | * | 148,000 | 125,000 | 15.5 |
| Dimethyl Glutarate | 20 | * | 97,400 | 62,600 | 35.7** |

*In these cases, the films broke during the experiment due to the physical, chemical and biological effects of the composting operation. Therefore, an accurate weight loss could not be determined in these cases.
**This composting experiment was run for 30 days.

EXAMPLE 30

Succinate copolyesters can also be injection molded. Poly(tetramethylene succinate-co-adipate) [76/24] and poly(tetramethylene-co-hexamethylene succinate) [84/16] were injection molded on a Toyo 90-1. The copolyesters were dried in a desiccant dryer at 60° C. for 16 hours. The molding conditions for both compositions are listed below.

| MOLDING CONDITIONS: | |
|---|---|
| Open Cycle Time | 4 sec |
| Inject + Hold Time | 20 sec |
| Cooling Time | 50 sec |
| Inject Time | 4 sec |
| Total Cycle Time | 78 sec |
| Nozzle Temp. | 120° C. |
| Zone 1 Temp. | 120° C. |
| Zone 2 Temp. | 120° C. |
| Zone 3 Temp. | 120° C. |
| Zone 4 Temp. | 110° C. |
| Injection Pressure | 600 psi |
| Hold Pressure | 600 psi |
| Mold Temp. | 12° C. |
| Clamping force | 90 tons |
| Screw speed | 93 rpm |
| Mode | Regular |
| Nozzle | Straight |

The succinate copolyesters molded easily to give white flexible bars. The physical properties of the bars are tabulated below.

| Molding Properties of Succinate Copolyesters | | | |
|---|---|---|---|
| Property of Molded Bars | PTS* | PTSA** [76/24] | PTHS*** [84/16] |
| Elongation at Break (%) | 2.1 | 15 | 194 |
| Tensile Strength (psi) | 1,510 | 2,570 | 3,280 |
| Flexural Strength (psi) | 3,930 | 2,730 | 3,200 |
| Flexural Modulus (psi) | 117,000 | 54,000 | 66,000 |
| Izod Impact (Notched, 23° C.), ft-lb./in | 0.58 | 6.79 | 4.36 |
| I.V. (dL/g) | 0.61 | 0.91 | 0.97 |
| Rockwell Hardness (R Scale) | 100 | 42 | 65 |

*PTS is poly(tetramethylene succinate).
**PTSA is poly(tetramethylene succinate-co-adipate).
***PTHS is poly(tetramethylene-co-hexamethylene succinate).

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. A process for preparing high molecular weight aliphatic copolyesters having good color comprising the following steps:

(i) combining aliphatic copolyester forming monomers with a titanium-based catalyst system and phosphorus-based additive, (ii) in a first stage, heating said reaction mixture between 190° and 220° C. at or slightly above atmospheric pressure, and (iii) in a second stage, heating said reaction mixture between 245° and 260° C. under a reduced pressure of 0.05 to 2.00 mm of Hg.

2. The process of claim 1 wherein a branching agent is added to said reaction mixture.

3. The process of claim 1 wherein an ion-containing monomer is added to said reaction mixture.

4. The process of claim 2 wherein said branching agent is selected from the group consisting of glycerol, pentaerythritol, trimellitic anhydride, pyromellitic dianhydride, tartaric acid, and derivatives thereof.

5. The process of claim 3 wherein said ion-containing monomer is selected from the group consisting of an alkaline earth metal salt of sulfoisophthalic acid or derivative thereof.

6. The process of claim 1 wherein said aliphatic copolyester has an inherent viscosity of about 1.0 to about 2.0 dL/g as measured at 25° C. for a 60/40 parts by weight solution of phenol/tetrachloroethane wherein said aliphatic copolyester comprises either repeat units having the following structure (A):

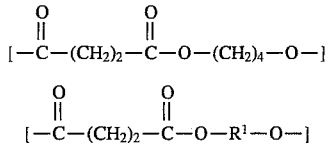

or repeat units having the following structure (B):

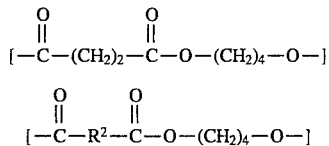

wherein $R^1$ is selected from the group consisting of C2–C12 alkylene, provided that said $C_2$–$C_{12}$ alkylene is other than —$(CH_2)_4$—; C4–C12 cycloalkylene; and C4–C12 oxyalkylene; and $R^2$ is selected from the group consisting of C3–C12 alkylene; C4–C12 cycloalkylene; and C2–C12 oxyalkylene.

7. The process of claim 1 wherein said copolyester is essentially linear.

* * * * *